United States Patent
Oketani et al.

(10) Patent No.: US 9,762,096 B2
(45) Date of Patent: Sep. 12, 2017

(54) INTERIOR PERMANENT MAGNET MOTOR (71) Applicants: Naohiro Oketani, Tokyo (JP); Masahiro Nigo, Tokyo (JP); Kazuhiko Baba, Tokyo (JP); Koji Yabe, Tokyo (JP)

(72) Inventors: Naohiro Oketani, Tokyo (JP); Masahiro Nigo, Tokyo (JP); Kazuhiko Baba, Tokyo (JP); Koji Yabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 181 days.

(21) Appl. No.: 14/763,866

(22) PCT Filed: Feb. 20, 2013

(86) PCT No.: PCT/JP2013/054174
§ 371 (c)(1),
(2) Date: Jul. 28, 2015

(87) PCT Pub. No.: WO2014/128863
PCT Pub. Date: Aug. 28, 2014

(65) Prior Publication Data
US 2015/0364959 A1 Dec. 17, 2015

(51) Int. Cl.
*H02K 21/12* (2006.01)
*H02K 1/27* (2006.01)

(52) U.S. Cl.
CPC ........... *H02K 1/2706* (2013.01); *H02K 1/276* (2013.01); *H02K 2213/03* (2013.01)

(58) Field of Classification Search
CPC .................................. H02K 1/27; H02K 15/03
(Continued)

(56) References Cited

U.S. PATENT DOCUMENTS

2008/0307634 A1  12/2008  Nishizawa et al.

FOREIGN PATENT DOCUMENTS

EP  0 895 337 A1  2/1999
JP  H06-133479 A  5/1994
(Continued)

OTHER PUBLICATIONS

International Search Report of the International Searching Authority mailed May 14, 2013 for the corresponding international application No. PCT/JP2013/054174 (and English translation).
(Continued)

*Primary Examiner* — Jose Gonzalez Quinones
(74) *Attorney, Agent, or Firm* — Posz Law Group, PLC (57) ABSTRACT

An interior permanent magnet motor includes: a rotor; a stator; and a plurality of permanent magnets respectively inserted into a plurality of magnet insertion holes formed in a rotor core, the rotor core being formed by laminating a plurality of magnetic steel sheets, the magnetic steel sheets including first magnetic steel sheets each not having a magnet stopper in the magnet insertion hole, and second magnetic steel sheets each having magnet stoppers at both end portions of the magnet insertion hole, the rotor core including a laminate of the magnetic steel sheets in a lamination mode in which, when $H_n$ represents a distance between an upper end surface of the second magnetic steel sheet and an upper end surface of the n-th second magnetic steel sheet, a progression of differences of $H_n$ is a geometric progression.

4 Claims, 5 Drawing Sheets

(58) Field of Classification Search
USPC .............. 310/156.01, 156.08, 56.21, 156.53,
310/156.56, 156.63, 56.65, 156.11
See application file for complete search history.

(56) References Cited

FOREIGN PATENT DOCUMENTS

| | | | |
|---|---|---|---|
| JP | 09308148 | A | 11/1997 |
| JP | 2006-033982 | A | 2/2006 |
| JP | 2008-011692 | A | 1/2008 |
| JP | 2009-131140 | A | 6/2009 |
| JP | 2010110167 | A * | 5/2010 |
| JP | 2010-154587 | A | 7/2010 |
| JP | 2010-206853 | A | 9/2010 |
| JP | 2012039746 | A * | 2/2012 |
| JP | 2012213268 | A * | 11/2012 |
| WO | 2009/142060 | A1 | 11/2009 |
| WO | 2011/121982 | A1 | 10/2011 |

OTHER PUBLICATIONS

Extended European Search Report dated Oct. 6, 2016 in the corresponding EP application No. 13875570.7.

* cited by examiner

INTERIOR PERMANENT MAGNET MOTOR

CROSS REFERENCE TO RELATED APPLICATION

This application is a U.S. national stage application of PCT/JP2013/054174 filed on Feb. 20, 2013, the content of which is incorporated herein by reference.

TECHNICAL FIELD

The present invention relates to an interior permanent magnet motor.

BACKGROUND ART

In a general interior permanent magnet motor, as many magnet insertion holes as the number of poles are formed in advance in an axial direction through a rotor core formed by laminating and fixing a plurality of magnetic steel sheets punched into a predetermined shape. When the rotor is assembled, permanent magnets are inserted into corresponding magnet insertion holes. When the electric motor is operated, forces caused by the change in attracting force between the magnet and a tooth leading end and by the acceleration and deceleration act on the magnet, and hence the magnet may move laterally in a circumferential direction inside the magnet insertion hole. A large amount of movement of the magnet inside the magnet insertion hole causes vibration and noise, which further causes wearing, cracking, and chipping of the magnet. Therefore, in the vicinity of the lateral ends of the magnet insertion hole, steps or projections are often formed as lateral magnet stoppers against the movement of the magnet.

On the other hand, when the magnet stoppers are formed in the magnet insertion hole, the distance between the edges of the hole is reduced in this part, and thus the magnetic flux passes across the magnet more easily as compared to the case in the periphery thereof. Therefore, there has been a problem in that, when the magnet is exposed to a magnetic field caused by a winding current of a stator, the magnet tends to demagnetize in the vicinity of the magnet stoppers of the magnet insertion hole.

In a normal case, the lateral magnet stoppers against the movement of the magnet are not necessary in all of the laminated steel sheets, and it is sufficient that the lateral magnet stoppers be formed in only at least two steel sheets spaced apart in the axial direction. The necessary number thereof depends on the force of the magnet that tries to laterally move and the strength of the magnet stopper per sheet. In view of this, in order to reduce the demagnetization to be caused when the magnet stoppers are formed, the following method is conceivable. The magnet stoppers are formed in, among the plurality of magnetic steel sheets forming the rotor core, only at least two steel sheets spaced apart in the axial direction, and the magnet stoppers are not formed in the other steel sheets. In this manner, the use number (ratio) of steel sheets that may easily cause the demagnetization of the magnet is reduced.

As the configuration relating to such a method, for example, there is known a configuration disclosed in Patent Literature 1. In the configuration of Patent Literature 1, two types of steel sheets, that is, a steel sheet having a magnet insertion hole with a large lateral width in the circumferential direction (referred to as "steel sheet A") and a steel sheet having a magnet insertion hole with a small lateral width in the circumferential direction (referred to as "steel sheet B") are prepared, and the position of the magnet is regulated by two or more steel sheets B.

CITATION LIST

Patent Literature

[PTL 1] JP 4005988 B2

SUMMARY OF INVENTION

Technical Problem

However, in the configuration of Patent Literature 1, at the time of assembly of the rotor, when the magnet is inserted into the magnet insertion hole, the magnet is slightly inclined within a range of a gap between the magnet and the magnet insertion hole of the steel sheet B. Even with a slight inclination, when the interval between the steel sheets B in the lamination direction is long, the positional misalignment of the corner of the magnet leading end is increased due to the inclination, and it is not easy to insert the corner of the magnet leading end without interfering with the edge of the magnet insertion hole. Further, when the interval between the steel sheets B in the lamination direction is set short, the insertability of the magnet is improved, but on the other hand, the number of the steel sheets B is increased, which may reduce the demagnetization resistance of the electric motor. In Patent Literature 1, no disclosure is made on at what interval the steel sheets B are required to be arranged in order to reduce the use number thereof and suppress the reduction in demagnetization resistance.

The present invention has been made in view of the above, and has an object to provide an interior permanent magnet motor capable of improving the insertability of the magnet into the magnet insertion hole and further suppressing the reduction in demagnetization resistance of the electric motor while reducing the movement of the magnet to reduce the noise and reduce the risk of wearing, cracking, and chipping of the magnet.

Solution to Problem

In order to achieve the object described above, according to one embodiment of the present invention, there is provided an interior permanent magnet motor, including: a rotor; a stator installed so as to be opposed to the rotor with an air gap; and a plurality of permanent magnets respectively inserted into a plurality of magnet insertion holes formed in a rotor core of the rotor, the rotor core being formed by laminating a plurality of magnetic steel sheets, the plurality of magnetic steel sheets including first magnetic steel sheets each not having a magnet stopper in the magnet insertion hole, and second magnetic steel sheets each having magnet stoppers at both end portions of the magnet insertion hole, the rotor core including a laminate of the magnetic steel sheets in a lamination mode in which, when $H_n$ represents a distance between an upper end surface of the second magnetic steel sheet that comes first when only the second magnetic steel sheets are sequentially counted in a lamination direction from an upper side of the rotor core and an upper end surface of the n-th second magnetic steel sheet, a progression of differences of $H_n$ is a geometric progression.

Advantageous Effects of Invention

According to the one embodiment of the present invention, it is possible to improve the insertability of the magnet into the magnet insertion hole and further suppressing the reduction in demagnetization resistance of the electric motor while reducing the movement of the magnet to reduce the noise and reduce the risk of wearing, cracking, and chipping of the magnet.

DESCRIPTION OF EMBODIMENTS

Now, an interior permanent magnet motor according to embodiments of the present invention is described with reference to the accompanying drawings. Note that, in the drawings, the same reference symbols represent the same or corresponding parts.

First Embodiment

Figure 1:
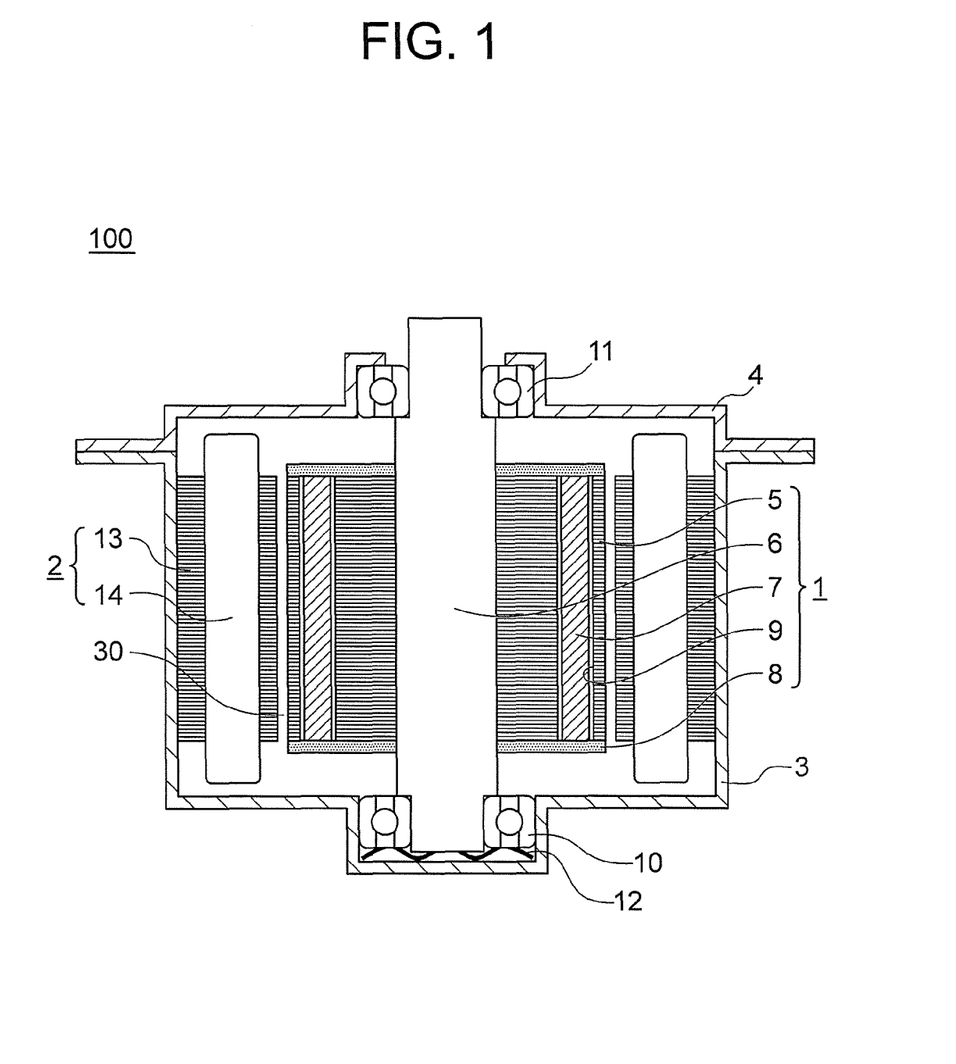
FIG. 1 is a vertical sectional view for illustrating a schematic configuration of an interior permanent magnet motor according to a first embodiment of the present invention.

FIG. 1 is a vertical sectional view for illustrating a schematic configuration of an interior permanent magnet motor according to a first embodiment of the present invention. An interior permanent magnet motor 100 according to the first embodiment includes a rotor 1, a stator 2, a frame 3, and a bracket 4.

The rotor 1 includes a rotor core 5, a shaft 6, a plurality of permanent magnets (for example, rare-earth magnets) 7, and a pair of upper and lower end plates 8. The rotor core 5 is formed by, for example, laminating and fixing a plurality of magnetic steel sheets punched into a predetermined shape. The rotor core 5 has, for example, a substantially annular shape as viewed in a rotary shaft direction. The rotor core 5 has a plurality of magnet insertion holes 9 formed in parts of the outer periphery thereof. The plurality of magnet insertion holes 9 are formed as many as the number of poles, and are arranged at, for example, equal intervals in a circumferential direction.

Each of the magnet insertion holes 9 extends in the rotary shaft direction of the rotor core 5 (direction in which the shaft 6 extends), and is opened at both end surfaces thereof in the rotary shaft direction. The permanent magnet 7 having a substantially cuboid shape is inserted into each of the magnet insertion holes 9.

The end plates 8 are mounted on both the end surfaces of the rotor core 5 in the rotary shaft direction. The pair of end plates 8 at least partially covers the openings of the plurality of magnet insertion holes 9 in both the end surfaces of the rotor core 5 (in the illustrated example, the pair of end plates 8 entirely covers the openings), and plays a role of a retainer for the permanent magnets 7. Examples of means for mounting the end plate 8 to the end surface of the rotor core 5 may include, although not shown, fastening by forming a through hole and using a bolt or a rivet, and press-fitting by forming a spigot joint portion.

The shaft 6 is fitted into a shaft fitting hole formed in the center of the rotor core 5. The shaft 6 extends along the rotary shaft direction in the rotor core 5, and has one end side rotatably supported by the frame 3 through intermediation of a bearing 10, and the other end side rotatably supported by the bracket 4 through intermediation of a bearing 11. On the bearing surface of the bearing 10, a wave washer 12 for applying a preload is arranged. The shaft 6 has, for example, a circular shape in lateral cross section, and in this case, the shaft fitting hole is also formed into a circular shape in accordance therewith.

The stator 2 includes a stator core 13 and a winding 14. The stator core 13 is formed by, for example, laminating and fixing a plurality of magnetic steel sheets punched into a predetermined shape. The stator core 13 has, for example, a substantially annular shape as viewed in the rotary shaft direction. In parts of the stator core 13 closer to the inner periphery thereof, a plurality of teeth (not shown) are formed. The teeth are positioned at, for example, substantially equal intervals in the circumferential direction. The winding 14 is wound around those teeth via an insulator (not shown). The stator 2 is fixed to the inner side of the frame 3 by methods such as shrink fitting, and is installed so as to be opposed to the rotor 1 with a predetermined air gap 30.

The frame 3 supports one end side of the rotor 1 through intermediation of the bearing 10, and houses the stator 2. The frame 3 has, for example, a substantially cylindrical shape. One end of the frame 3 in the axial direction is opened to have a flange shape. Further, the frame 3 has a bottom on the other end thereof.

The bracket 4 supports the other end side of the rotor 1 through intermediation of the bearing 11. The bracket 4 has, for example, a substantially cylindrical shape as viewed in the rotary shaft direction. One end of the bracket 4 in the rotary shaft direction is opened to have a flange shape. Further, the other end of the bracket 4 has a hole formed therein so as to allow the output end of the shaft 6 to protrude therefrom.

The bracket 4 and the frame 3 are coupled to each other with fastening means (not shown) such as screws while abutting together the flange parts formed therein. Note that, in the first embodiment, the other end of the rotor 1 supported by the bearing 11 inside the bracket 4 corresponds to, but not particularly limited to, the load side for inputting and outputting torque to and from the electric motor.

Figure 2:
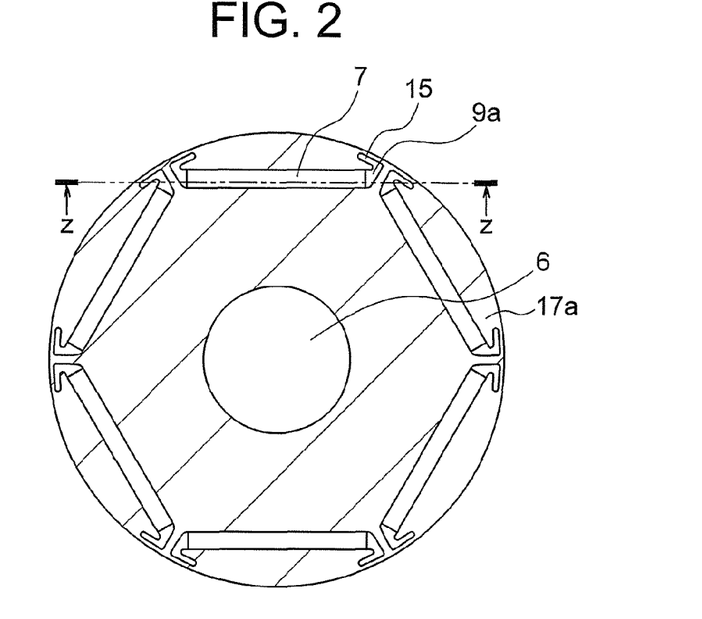
FIG. 2 is a lateral sectional view of a rotor core in a steel sheet not having a magnet stopper.
Figure 3:
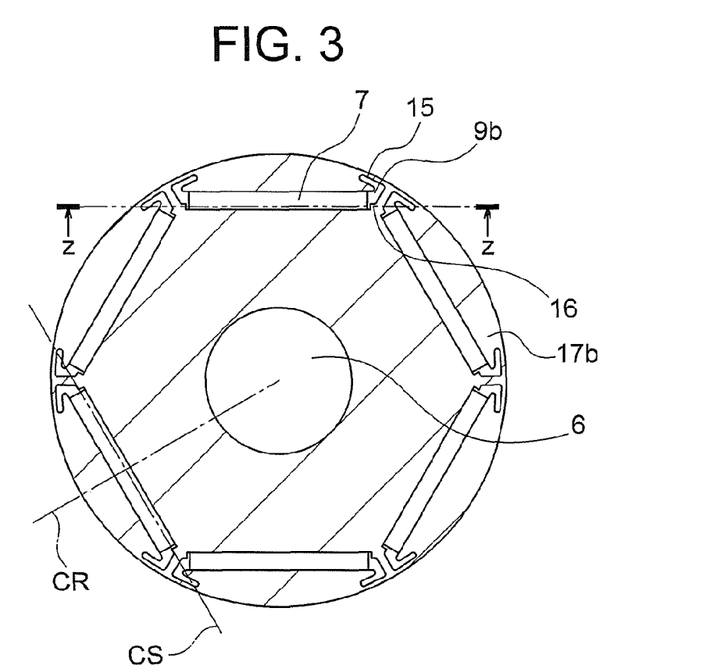
FIG. 3 is a lateral sectional view of the rotor core in a steel sheet having the magnet stoppers.

Now, the magnet insertion holes 9 are described in detail with reference to FIG. 2 and FIG. 3 assuming a case where, as an example, the rotor 1 is a six-pole rotor, in other words, there are six permanent magnets 7. FIG. 2 and FIG. 3 are both lateral sectional views of the rotor core. In particular, FIG. 2 is a lateral section of the rotor core in a steel sheet not having a magnet stopper to be described later, and FIG. 3 is a lateral section of the rotor core in a steel sheet having the magnet stoppers.

As illustrated in FIG. 2 and FIG. 3, there are two types of the magnet insertion holes 9, that is, a lateral sectional shape 9a and a lateral sectional shape 9b, and any one of the shapes is selected for each of the plurality of magnetic steel sheets forming the rotor core 5.

As illustrated in FIG. 2, the lateral sectional shape 9a of a first magnetic steel sheet 17a is connected to a flux barrier 15 without having the magnet stopper such as a step or a projection at each of lateral end portions of the magnet insertion hole 9. Therefore, there is no component playing a role as a lateral stopper against the movement of the permanent magnet 7 in the circumferential direction of the rotor core (technically, movement in an extending direction of a circumferential-direction straight line CS to be described later).

On the other hand, as illustrated in FIG. 3, the lateral sectional shape 9b of a second magnetic steel sheet 17b has a magnet stopper 16 between each of the lateral end portions of the magnet insertion hole 9 and the flux barrier 15 between the poles. The magnet stoppers 16 playa role as lateral stoppers against the movement of the permanent magnet 7 in the circumferential direction.

Note that, in the first embodiment, the magnet stopper 16 is a step that is formed so as to approach the end portion of the permanent magnet 7 in the circumferential direction, but other shapes may be employed as long as the shape has a function as the lateral stopper against the movement of the permanent magnet 7 in the circumferential direction. For example, the magnet stopper 16 may be a projection projecting so as to approach the end portion of the permanent magnet 7 in the circumferential direction.

Figure 4:
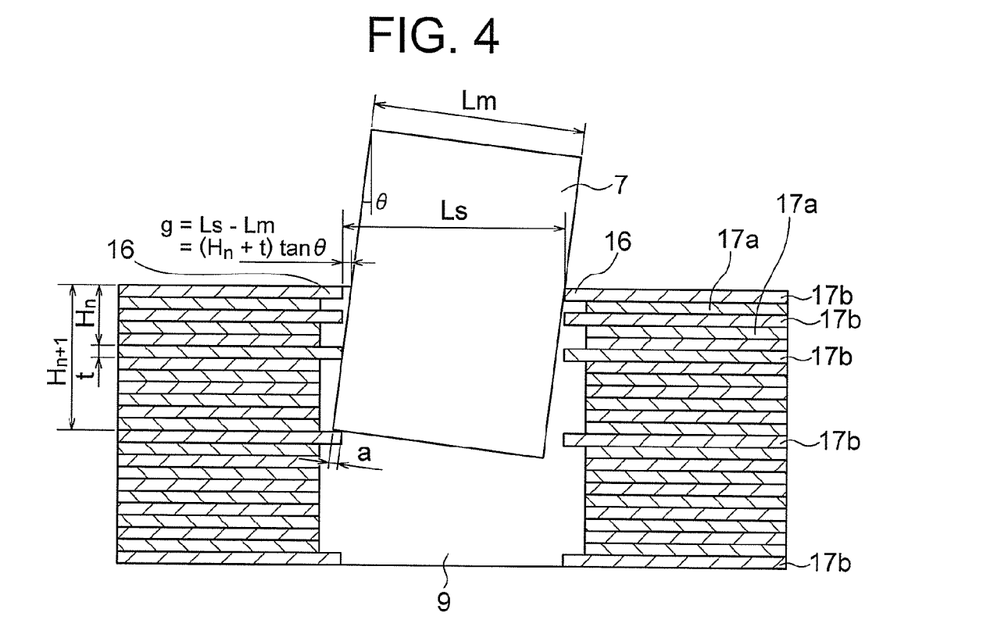
FIG. 4 is a vertical sectional view of the rotor core taken along the line Z-Z of FIG. 2 and FIG. 3.

FIG. 4 is a vertical sectional view of the rotor core taken along the line Z-Z of FIG. 2 and FIG. 3. Note that, the line Z-Z is set in such a mode that the vertical section with the pair of lateral magnet stoppers 16 appearing in the magnetic steel sheet 17b is provided so that the arrangement of the magnetic steel sheets 17a having the lateral sectional shape 9a and the magnetic steel sheets 17b having the lateral sectional shape 9b in the lamination direction is understood. Further, except in details of both ends, most part of each of the magnet insertion holes 9 extends along the circumferential-direction straight line orthogonal to the corresponding radial line of the rotor core 5 (magnetic steel sheets 17a and 17b) (in FIG. 3, the corresponding radial line CR and the circumferential-direction straight line CS for an arbitrary magnet insertion hole 9 are indicated). Further, the above-mentioned line Z-Z is also a line extending parallel to the circumferential-direction straight line.

Note that, the breakdown of the arrangement of the magnetic steel sheets 17a and 17b illustrated in FIG. 4 are merely an example. Further, FIG. 4 is illustrated for describing the insertability of the permanent magnet 7 into the magnet insertion hole 9, and there is illustrated a state at a time point at which the permanent magnet 7 is inserted halfway from the opening of the upper end in the lamination direction. Further, the thickness of the magnetic steel sheets 17a and 17b and the gap between the permanent magnet 7 and the magnet insertion hole 9 are illustrated significantly larger than the actual settings.

The magnetic steel sheets 17b are intermittently arranged in the lamination direction among the magnetic steel sheets 17a. The intervals between the magnetic steel sheets 17b are set in a substantial geometric progression from one side in the lamination direction (in the illustrated example, the upstream side in the direction of inserting the permanent magnet, hereinafter referred to as "upper side") toward the other side (in the illustrated example, the downstream side in the direction of inserting the permanent magnet, hereinafter referred to as "lower side"). This setting is described below.

First, the distance between the upper end surface of the magnetic steel sheet 17b that comes first when only the magnetic steel sheets 17b are sequentially counted in the lamination direction from the upper side of the rotor core 5 and the upper end surface of the n-th magnetic steel sheet 17b is represented by $H_n$. The dimension of the permanent magnet 7 in the circumferential direction (technically, direction along the circumferential-direction straight line CS) is represented by Lm. The distance between the inner end surfaces of the pair of lateral magnet stoppers 16 is represented by Ls. The thickness of each of the magnetic steel sheets 17a and 17b is represented by t. Further, in this embodiment, the first uppermost sheet of the rotor core 5 is the magnetic steel sheet 17b.

A slight gap g (=Ls−Lm) is formed between the inner end surface of each of the pair of lateral magnet stoppers 16 and the end surface of the permanent magnet 7 in the circumferential direction. When the gap g is large, the effect of restricting the movement of the permanent magnet 7 is decreased, and hence the gap g is set as small as possible under consideration of the dimensional fluctuations of the permanent magnet 7 and the fluctuations in distance between the lateral inner end surfaces of the magnet stoppers 16.

At a time point at which the insertion of the permanent magnet 7 is finished until the above-mentioned n-th magnetic steel sheet 17b, the permanent magnet 7 is most inclined within the range of the gap g when the right side surface in the drawing of the permanent magnet 7 is brought into contact with the right magnet stopper 16 in the drawing of the first magnetic steel sheet 17b, and the left side surface in the drawing of the permanent magnet 7 is brought into contact with the left magnet stopper 16 in the drawing of the n-th magnetic steel sheet 17b.

Normally, an inclination θ thereof is thought to be sufficiently small (can be approximated as tan θ=θ), and hence the following relationship can be represented.

$$g=(H_n+t)\theta \qquad \text{Expression (1)}$$

Further, Expression (1) is deformed to obtain the following expression.

$$\theta=g/(H_n+t) \qquad \text{Expression (2)}$$

With this inclination θ, when the permanent magnet 7 is further inserted, the corner of the leading end on the lower left side of the permanent magnet 7 abuts against the left magnet stopper 16 of the (n+1)th magnetic steel sheet 17b. FIG. 4 is an illustration of this exact state.

When the adjustment margin necessary for the permanent magnet 7 in the circumferential direction in order to avoid the above-mentioned "abutment" is represented by a, the following expression is obtained.

$$a \geq (H_{n+1}-H_n-t)\sin\theta \qquad \text{Expression (3)}$$

Further, the inclination θ is normally sufficiently small (can be approximated as sin θ=θ), and hence Expression (3) can be written as follows.

$$a \geq (H_{n+1}-H_n-t)\theta \qquad \text{Expression (4)}$$

Then, Expression (4) is rewritten with use of Expression (2) as follows.

$$a \geq g \times \{(H_{n+1}-H_n-t)/(H_n+t)\} \qquad \text{Expression (5)}$$

Expression (5) is organized to obtain a condition for inserting the permanent magnet 7 as follows.

$$H_{n+1} \leq \{(a/g)+1\} \times (H_n+t) \quad \text{Expression (6)}$$

In this case, when α is introduced with a relationship satisfying α≤{(a/g)+1}, Expression (6) can be written as follows.

$$H_{n+1} = \alpha(H_n+t) \quad \text{Expression (7)}$$

Then, in Expression (7), by considering the relationship of two n's, the following expression can be obtained.

$$H_{n+2}-H_{n+1} = \alpha(H_{n+1}-H_n) \quad \text{Expression (8)}$$

Then, in Expression (8), α is set to a constant value as follows.

$$\alpha = a/g+1 \quad \text{Expression (9)}$$

Figure 5:
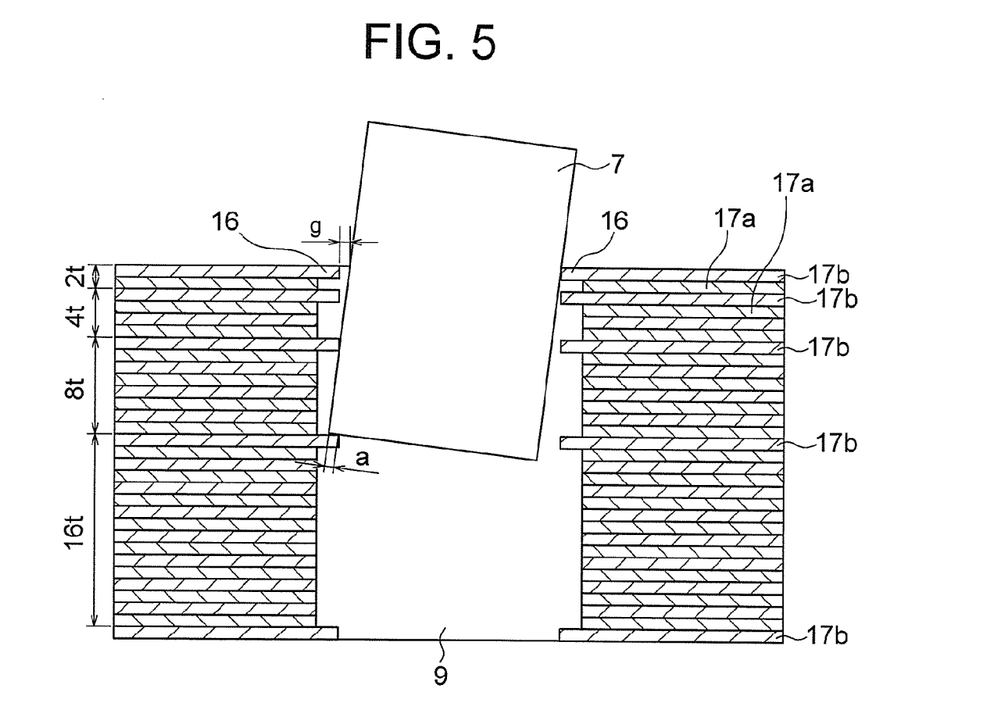
FIG. 5 is a view in the same mode as FIG. 4 for illustrating a specific example of an arrangement mode of the magnetic steel sheets having the magnet stoppers.

This means that the progression of differences $\{H_{n+1}-H_n\}$ of $H_n$ is set to the geometric progression with a common ratio α, and this setting most reduces the use number of the magnetic steel sheets 17b among the conditions of Expression (8). In FIG. 5, as an example, a case where α=2 (set to a=g) is set is illustrated. As illustrated in FIG. 5, in a configuration in which a total of 31 sheets of the magnetic steel sheets 17a and the magnetic steel sheets 17b are laminated, five magnetic steel sheets 17b are arranged. In contrast, for example, when all of the 31 sheets are arranged so that the intervals between the magnetic steel sheets 17b are equal intervals at an interval 2t between $H_1$ and $H_2$ on the upstream side during insertion, the number of the magnetic steel sheets 17b becomes 16, which uses a larger number of magnetic steel sheets with the magnet stoppers and thus significantly reduces the demagnetization resistance. In contrast, when the magnetic steel sheets 17b are prepared at equal intervals larger than an interval 8t or at equal intervals close to an interval 16t, particularly on the upstream side during insertion, the permanent magnet 7 may be significantly inclined, which corresponds to a case where the insertability is bad.

Note that, there is a restriction that, while α is not limited to an integer value, the interval $\{H_{n+1}-H_n\}$ between the magnetic steel sheets 17b only takes a value that is the integral multiple of the thickness t (assuming that the inter-lamination gap is neglected because the gap is small). However, by setting the interval $\{H_{n+1}-H_n\}$ between the magnetic steel sheets 17b to a value close to a value satisfying Expression (8), similar effects can be obtained.

Note that, the type of the permanent magnet 7 is the rare-earth magnet, but even with other magnets, similar effects can be obtained through application of the present invention. For example, there is only a difference in that irreversible demagnetization tends to occur when the magnet is exposed to a strong demagnetizing field under high temperature in the case of the rare-earth magnet and under low temperature in the case of a ferrite magnet.

According to the interior permanent magnet motor of the first embodiment configured as described above, while reducing the movement of the permanent magnet to reduce the noise and the risk of wearing, cracking, and chipping of the permanent magnet, the insertability of the permanent magnet can be improved, and the use number (ratio) of the magnetic steel sheets having the magnet stoppers can be reduced as compared to the case where the magnetic steel sheets having the magnet stoppers are simply arranged at equal intervals for use. Therefore, the reduction in demagnetization resistance can be suppressed.

Second Embodiment

Figure 6:
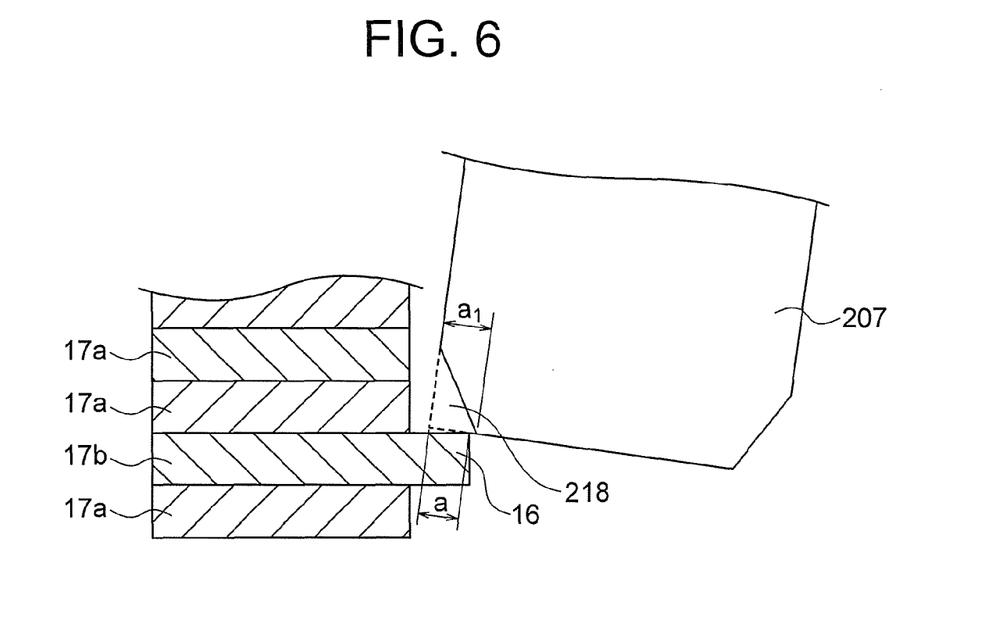
FIG. 6 is a view for illustrating a relationship of abutment between a permanent magnet and a magnet stopper in an interior permanent magnet motor according to a second embodiment of the present invention.

Next, with reference to FIG. 6, a second embodiment of the present invention is described. FIG. 6 is a view for illustrating a relationship of abutment between a permanent magnet and a magnet stopper in an interior permanent magnet motor according to the second embodiment. Note that, the second embodiment is similar to the case of the above-mentioned first embodiment except for the part to be described below. As illustrated in FIG. 6, a chamfered portion 218 is formed at a lower corner of a permanent magnet 207.

Under a state in which the chamfered portion 218 is formed as described above, the relationship between the adjustment margin a in the circumferential direction, which is necessary for avoiding abutment of the lower corner of the permanent magnet 207 against the magnet stopper 16, and a dimension $a_1$ of the chamfered portion 218 in the circumferential direction can be set as follows.

$$a_1 \geq a \quad \text{Expression (10)}$$

When the chamfered portion 218 is formed based on Expression (10), the inclined surface of the chamfered portion 218 abuts against the edge of the magnet stopper 16. As described above, when a surface having an inclination closer to the magnet insertion direction is brought into contact with the magnet stopper 16, the inclined surface of the chamfered portion 218 can serve as a guide to correct the inclination of the permanent magnet 207.

According to the configuration of the second embodiment as described above, similar advantages to those in the above-mentioned first embodiment can be obtained. In addition, the insertability of the permanent magnet can be further improved. Note that, in FIG. 6, the chamfered portion is illustrated into a shape in which the lower corner of the permanent magnet is cut by a plane, but the mode of the chamfered portion is not limited thereto. That is, the chamfered portion is only required to have a function that a surface having an inclination closer to the magnet insertion direction than the state before being chamfered is brought into contact with the magnet stopper. Therefore, for example, a shape in which the lower corner of the permanent magnet is cut by a curve may be employed.

Third Embodiment

Figure 7:
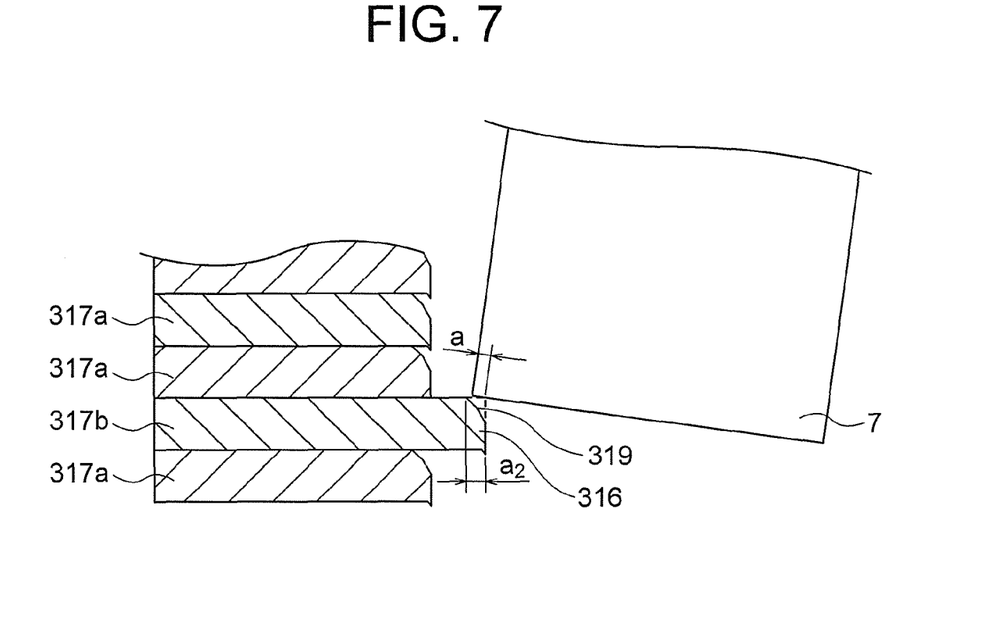
FIG. 7 is a view in the same mode as FIG. 6 according to a third embodiment of the present invention.

Next, with reference to FIG. 7, a third embodiment of the present invention is described. FIG. 7 is a view in the same mode as FIG. 6 according to the third embodiment. Note that, the third embodiment is similar to the case of the above-mentioned first embodiment except for the part to be described below.

In the third embodiment, magnetic steel sheets 317a and 317b having the magnet insertion holes 9 formed by punching are used. That is, in punching, an upper side of a magnet stopper 316 of the magnetic steel sheet 317b becomes the shear droop side, and a lower side of the magnet stopper 316 becomes the burr side. In the third embodiment, a shear droop-shaped portion 319 generated at this time on the upper side of the magnet stopper 316 is used. Note that, in the illustrated example, a case where the magnet insertion holes 9 are formed by punching in both of the magnetic steel sheet 317a and the magnetic steel sheet 317b is illustrated, but in the fourth embodiment, such a mode that only the magnetic steel sheet 317b having the magnet stoppers 316 is subjected to punching may be employed.

When a dimension $a_2$ in the circumferential direction of the shear droop-shaped portion 319 on the upper side of the magnetic steel sheet 317b is set with respect to the adjustment margin a in the circumferential direction, which is necessary for avoiding abutment of the lower corner of the permanent magnet 7 against the magnet stopper 316, as $$a_2 \geq a \quad \text{Expression (11)},$$

the lower corner of the permanent magnet 7 abuts against the inclined surface of the shear droop-shaped portion 319. As described above, when a surface having an inclination closer to the magnet insertion direction is brought into contact with the permanent magnet 7, the shear droop-shaped portion 319 can serve as a guide to correct the inclination of the permanent magnet 7.

According to the configuration of the third embodiment as described above, similar advantages to those in the above-mentioned first embodiment can be obtained. In addition, the insertability of the permanent magnet can be further improved. Note that, in the description above, the shear droop-shaped portion 319 on the upper side of the magnetic steel sheet 317b is formed at the time of punching. Alternatively, the shear droop-shaped portion 319 may be formed by edge-rounding of the upper side of the magnetic steel sheet 317b after the punching. In this case, the upper side may be the burr side.

Fourth Embodiment

Figure 8:
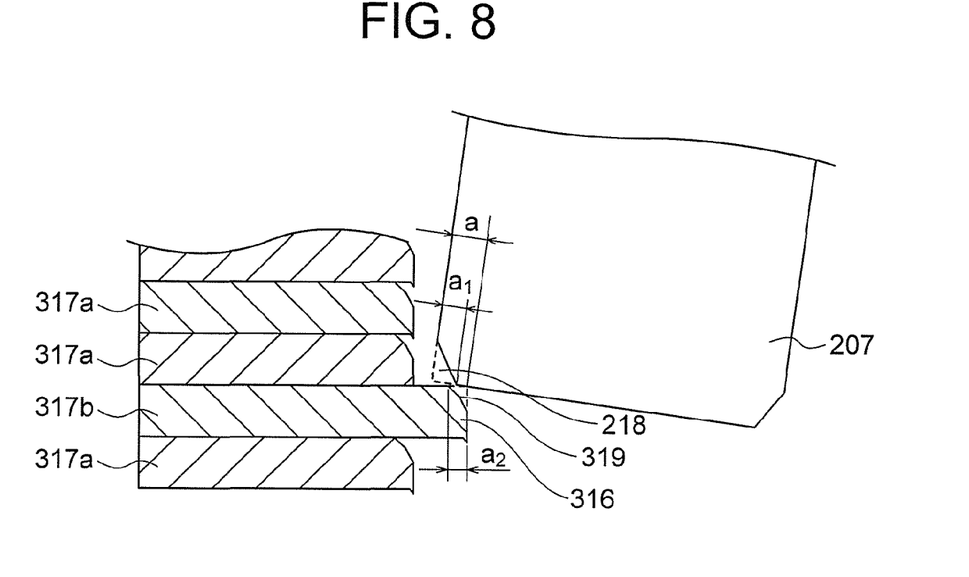
FIG. 8 is a view in the same mode as FIG. 6 according to a fourth embodiment of the present invention.

Next, with reference to FIG. 8, a fourth embodiment of the present invention is described. FIG. 8 is a view in the same mode as FIG. 6 according to the fourth embodiment. Note that, the fourth embodiment is obtained by combining the second embodiment and the third embodiment as described later. Parts other than those to be described below are similar to those in the case of the above-mentioned first embodiment.

In the fourth embodiment, the permanent magnet 207 of the above-mentioned second embodiment is combined with the magnetic steel sheets 317a and 317b of the above-mentioned third embodiment. Therefore, both of the chamfered portion 218 of the permanent magnet 207 and the shear droop-shaped portion 319 of the magnet stopper 316 are provided.

When the dimension $a_1$ in the circumferential direction of the chamfered portion 218 and the dimension $a_2$ in the circumferential direction of the shear droop-shaped portion 319 on the upper side of the magnetic steel sheet 317b are set with respect to the adjustment margin a in the circumferential direction, which is necessary for avoiding abutment of the lower corner of the permanent magnet 207 against the magnet stopper 316, as $$a_1 + a_2 \geq a \quad \text{Expression (12)},$$

the inclined surface of the chamfered portion 218 and the inclined surface of the shear droop-shaped portion 319 are brought into contact with each other. As described above, the surface of the magnet stopper having an inclination closer to the magnet insertion direction and the surface of the permanent magnet having an inclination closer to the magnet insertion direction are brought into contact with each other. In this manner, the inclined surface of the chamfered portion 218 and the inclined surface of the shear droop-shaped portion 319 mutually exert the guiding function, and thus the inclination of the permanent magnet 207 is further corrected.

Further, based on FIG. 8 and Expression (6), in order to avoid abutment of the lower corner of the permanent magnet 207 against the magnet stopper 316, when the dimensional difference (total gap) in the circumferential direction between the permanent magnet and the magnet insertion hole is represented by g, values of $a_1$, $a_2$, $H_n$, g, and t may be set so as to satisfy the following expression.

$$H_{n+1} \leq \{(a_1 + a_2)/g + 1\}(H_n + t) \quad \text{Expression (13)}$$

As described above, the value of $H_n$ can be set based on the values of $a_1$, $a_2$, g, and t. Further, conversely, the necessary values of $a_1$, $a_2$, g, and t can be determined based on a desired value of $H_n$.

Fifth Embodiment

In the above-mentioned first to fourth embodiments, the progression of differences $\{H_{n+1} - H_n\}$ of $H_n$ is set to the geometric progression with the common ratio $\alpha$ in the entire rotor core, but the present invention is not limited thereto. The rotor core in the present invention may have such a configuration that, over and/or under a laminate of the magnetic steel sheets in a lamination mode in which the progression of differences $\{H_{n+1} - H_n\}$ of $H_n$ is set to the geometric progression with the common ratio $\alpha$, one arbitrary magnetic steel sheet or a laminate of magnetic steel sheets not satisfying the above-mentioned lamination mode is added.

Sixth Embodiment

Figure 9:
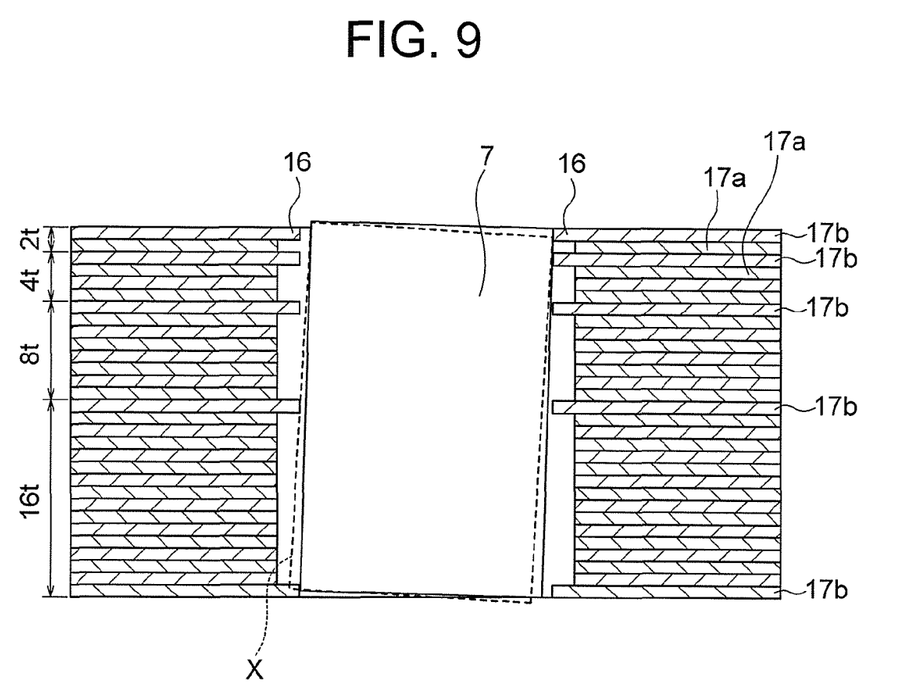
FIG. 9 is a view in the same mode as FIG. 5 according to a sixth embodiment of the present invention.

Next, with reference to FIG. 9, a sixth embodiment of the present invention is described. FIG. 9 is a view in the same mode as FIG. 5 according to the sixth embodiment. Note that, the sixth embodiment is similar to the case of the above-mentioned first embodiment except for the part to be described below.

When the total number of the magnetic steel sheets forming the rotor core is determined, and when the breakdown of the magnetic steel sheets and the lamination positions (lamination order) of the magnetic steel sheets having the magnet stoppers are determined based on the rule of Expression (8) described above, the magnetic steel sheet having the magnet stoppers may not be always arranged at the lower end surface of the rotor core. Regarding this point, in the sixth embodiment, the rotor core is configured as follows. There is provided a laminate of magnetic steel sheets in a lamination mode based on the rule of Expression (8) described above except for the magnetic steel sheet arranged at the lower end surface of the rotor core, and the magnetic steel sheet arranged at the lower end surface of the rotor core is always set to the magnetic steel sheet having the magnet stoppers regardless of the rule of Expression (8) described above. FIG. 9 is an example thereof. That is, the total number of magnetic steel sheets forming the rotor core is determined as 30. From the first sheet to the twenty-ninth sheet, there is provided a laminate of magnetic steel sheets in the lamination mode based on the rule of Expression (8) described above. In the thirtieth sheet, according to the rule of Expression (8) described above, the magnetic steel sheet 17a not having the magnet stopper 16 is originally required to be arranged, but instead, the magnetic steel sheet 17b having the magnet stoppers 16 is arranged.

Note that, in other words, the sixth embodiment can be regarded as one aspect of the above-mentioned fifth embodiment by interpreting the sixth embodiment as a mode in which the rotor core partially includes the laminate of the magnetic steel sheets in the lamination mode based on the rule of Expression (8) described above, and one magnetic steel sheet having the magnet stoppers is added under the laminate.

According to the sixth embodiment, in addition to the effects of the above-mentioned first embodiment, the following advantages can be obtained. That is, when the rotor core is formed only of the laminate of the magnetic steel sheets in the lamination mode based on the rule of Expression (8) described above, under such a condition that, as illustrated in FIG. 9, the lowermost magnetic steel sheet 17b is distanced from the lower end surface of the rotor core 5 (condition that the lowermost magnetic steel sheet 17b is separated by 15t from the lower end surface of the rotor core 5), as represented by reference symbol X in FIG. 9, the permanent magnet 7 may be significantly inclined. However, in the sixth embodiment, the magnetic steel sheet 17b is always placed at the lowermost position, and hence such an inclination can be avoided.

Although the details of the present invention are specifically described above with reference to the preferred embodiments, it is apparent that persons skilled in the art may adopt various modifications based on the basic technical concepts and teachings of the present invention.

REFERENCE SIGNS LIST 1 rotor, 2 stator, 5 rotor core, 7, 207 permanent magnet, 9 magnet insertion hole, 16, 316 magnet stopper, 17a, 17b, 317a, 317b magnetic steel sheet, 218 chamfered portion, 319 shear droop-shaped portion

The invention claimed is:

1. An interior permanent magnet motor, comprising:
a rotor;
a stator installed so as to be opposed to the rotor with an air gap; and
a plurality of permanent magnets respectively inserted into a plurality of magnet insertion holes formed in a rotor core of the rotor,
the rotor core being formed by laminating a plurality of magnetic steel sheets,
the plurality of magnetic steel sheets comprising a plurality of first magnetic steel sheets each not having a magnet stopper in the magnet insertion hole, and a plurality of second magnetic steel sheets each having magnet stoppers at both end portions of the magnet insertion hole,
the rotor core comprising a laminate of the magnetic steel sheets in a lamination mode in which, when $H_n$ represents a distance between an upper end surface of the second magnetic steel sheet that comes first when only the second magnetic steel sheets are sequentially counted in a lamination direction from an upper side of the rotor core and an upper end surface of the n-th second magnetic steel sheet, a progression of differences of $H_n$ is a geometric progression, wherein
a chamfered portion is formed at a lower corner of the permanent magnet,
at least the magnet insertion hole of the second magnetic steel sheet is formed by punching, and a shear droop-shaped portion is formed on an upper side of the magnet stopper, and
when $a_1$ represents a width of the chamfered portion in a circumferential direction, $a_2$ represents a width of the shear droop-shaped portion in the circumferential direction, g represents a dimensional difference in the circumferential direction between the permanent magnet and the magnet insertion hole, and t represents a thickness of each of the magnetic steel sheets, $a_1$, $a_2$, $H_n$, g, and t are set so as to satisfy the following expression:

$$H_{n+1} \leq \{(a_1+a_2)/g+1\}(H_n+t) \ (n=1,2,\ldots).$$

2. An interior permanent magnet motor according to claim 1, wherein a chamfered portion is formed at a lower corner of the permanent magnet.

3. An interior permanent magnet motor according to claim 1, wherein at least the magnet insertion hole of the second magnetic steel sheet is formed by punching, and a shear droop-shaped portion is formed on an upper side of the magnet stopper.

4. An interior permanent magnet motor according to claim 1, wherein the magnetic steel sheet arranged at a lower end surface of the rotor core is the second magnetic steel sheet.

* * * * *